Dec. 12, 1944. W. H. WEIMER 2,364,884
WORK CLAMPING MEANS FOR MACHINE TOOLS
Filed May 28, 1942
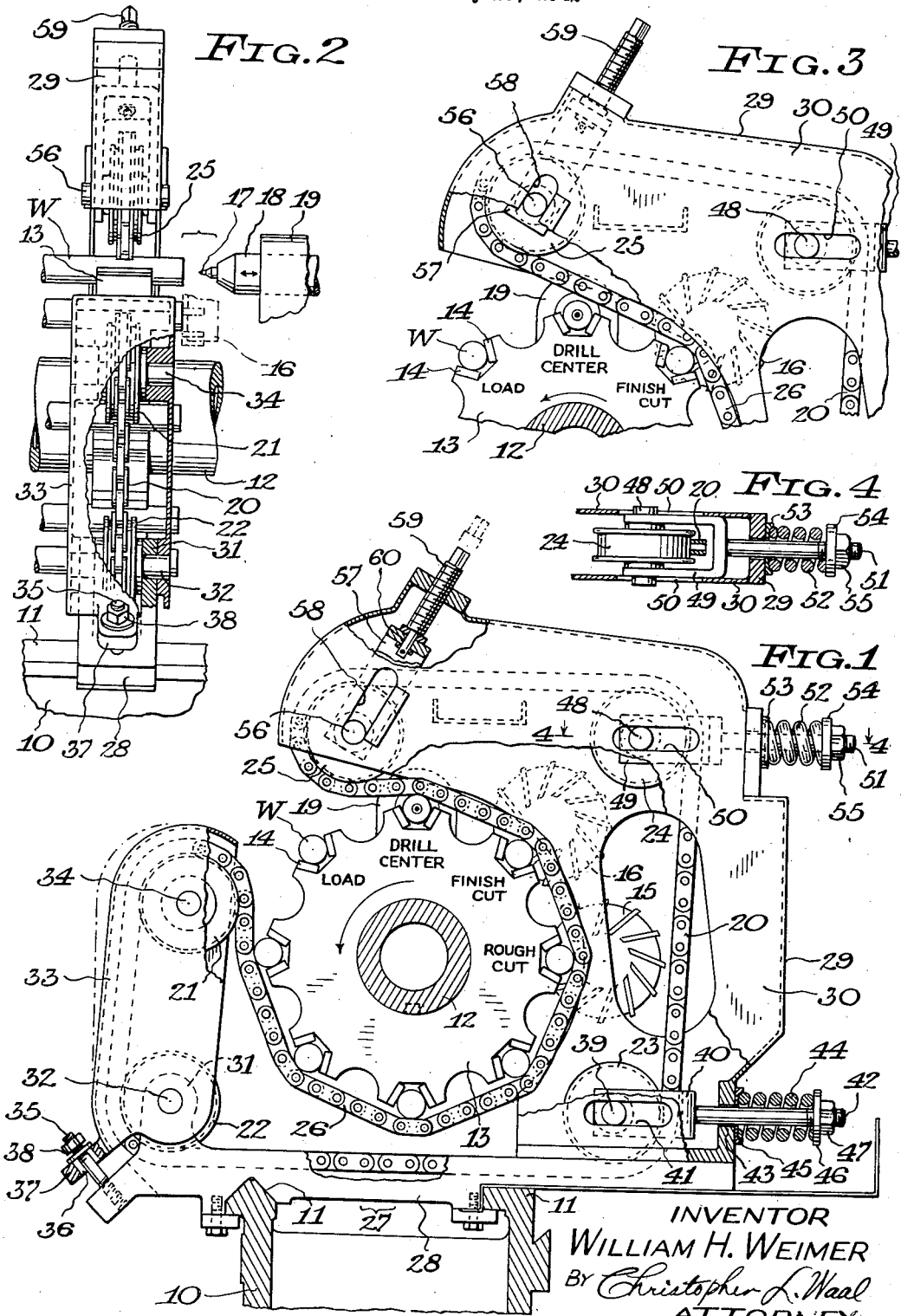
INVENTOR
WILLIAM H. WEIMER
BY Christopher L. Waal
ATTORNEY Patented Dec. 12, 1944

2,364,884

UNITED STATES PATENT OFFICE 2,364,884

WORK CLAMPING MEANS FOR MACHINE TOOLS

William H. Weimer, North Prairie, Wis., assignor to Davis & Thompson Company, West Allis, Wis., a corporation of Delaware Application May 28, 1942, Serial No. 444,871

8 Claims. (Cl. 29—26)

The present invention relates to machine tools, and more particularly to means for feeding and clamping the work.

A type of work clamping means for metal working machines has heretofore been devised in which a tensioned clamping band serves to hold the work in tooling position on a movable work carrier, the band being engageable with the work or with work gripping parts. This general type of work clamping means is exemplified in United States Patent 1,415,530, 1,637,176 and 1,704,080 to Frank M. Davis, respectively dated May 9, 1922, July 26, 1927, and March 5, 1929.

An object of the present invention is to provide an improved work clamping means of the tensioned band type which is so constructed as to have a wide range of clamping action and to minimize variations in clamping pressure during the movement of the work carrier.

Another object is to provide simple but effective means for locally releasing the tensioned clamping band from clamping engagement, so as to facilitate tool changes or adjustments.

Still another object is to support the work clamping portion of the band in such manner as to facilitate the feeding and clamping of work pieces of different size.

A further object is to provide supporting means for the work clamping portion of the band including a shiftable part which is yieldable toward and away from the band during the movement of the carrier, so as to accommodate the changing position of the work and to retain the work firmly on the carrier.

A still further object is to perfect details of construction generally.

The invention further consists in the several features hereinafter described and claimed.

In the accompanying drawing,

Fig. 1 is a transverse sectional elevation of a milling and drilling machine equipped with work clamping mechanism embodying the invention, parts being broken away and parts being shown in section;

Fig. 2 is a front elevation, parts of the work clamping mechanism being broken away and parts being shown in section;

Fig. 3 is an elevation similar to the upper portion of Fig. 1, but showing a work clamping band of the mechanism released from a work piece in the final tooling position, and Fig. 4 is a detail sectional view taken generally on the line 4—4 of Fig. 1.

In the drawing, the work clamping mechanism of the invention is shown to be applied to a combined milling and drilling machine, although the mechanism may be used on various types of machine tools.

The machine illustrated includes a frame 10 having horizontal ways 11 and further includes a rotatable work carrier which comprises a mandrel or arbor 12 extending parallel to the ways and provided with a work holding fixture 13. At its periphery the fixture has a series of work-receiving jaws 14 formed by hardened renewable V blocks and adapted to position work pieces or blanks W. For long work pieces, such as shafts or gun barrel forgings, the fixture may be formed of two or more parts axially spaced on the mandrel, as is well understood in this art. The work carrier may be modified in various ways to suit the work at hand.

The machine is provided with roughing and finishing milling cutters 15 and 16, respectively, for facing the ends of the work pieces, and is further provided with centering drills 17 for forming center holes in the faced ends of the work pieces. Each drill is detachably carried in a rotatable chuck 18, Fig. 2, which is suitably mounted for reciprocation in a housing 19. By way of example, the three successive operations, rough facing, finish facing, and drilling, are effected at stations spaced 45° apart, the drilling station being at the top of the carrier. The work carrier rotates intermittently, being indexed to its successive positions in any well known manner. However, it is also possible to provide for continuous rotation of the work carrier, as is well understood in this art.

A tensioned work clamping band 20, such as a block chain, is mounted on grooved guide pulleys or sheaves 21, 22, 23, 24 and 25 having parallel axes, the band lying in a plane normal to the axis of the work carrier and the pulleys being distributed about the carrier. The pulleys are so related to each other as to permit a reentrant open loop or bend 26 being formed in the chain to pass about the work carrier and to hold the work pieces in the carrier jaws 14. The work clamping portion of the loop is here shown to extend over about four-fifths of the circumference of the work carrier, leaving an opening or throat at the upper front portion of the carrier for loading and unloading the work pieces. At the throat of the loop the chain passes reversely over the pulleys 21 and 25. The several pulleys are carried on a supporting frame 27 having a base member 28 which is adjustable along the ways 11 of the machine frame 10.

The frame 21 further includes a housing 29 which is secured to the rear portion of the base member and extends upwardly therefrom at the rear of the work carrier. The upper portion of the housing 29 projects forwardly and overhangs the work carrier. The housing has parallel vertical side walls 30 and is open adjacent to the path of the work pieces to admit the chain loop 26.

At its front portion the base member 28 has spaced upstanding ears 31 carrying a shaft 32 with projecting ends. The pulley 22 is mounted on the shaft 32 and is disposed between the ears. A swingable hollow housing or arm 33 of U-shaped cross section is pivotally carried at its lower portion on the shaft 32 and projects upwardly in front of the work carrier, the open rear portion of the arm facing the work carrier. The pulley 21 is housed within the upper portion of the swingable arm 33 and is mounted on a shaft 34 carried by the arm at a point somewhat higher than the axis of the work carrier. From the front portion of the clamping loop 26 the chain passes over the pulley 21, thence downwardly within the arm 33 to the pulley 22, and thence along the base member 28 to the rear of the machine. The arm 33 is swingable forwardly and rearwardly, and its rearward movement toward the carrier is adjustably limited by a stud 35 carried by the base member and extending through a slot 36 in a lug 37 formed on the lower portion of the arm, the stud carrying thereon an adjustable nut 38. The swinging arm 33 serves to keep the chain in contact with the work pieces, so as to retain them in the jaws 14 at the descending part of the rotatable work carrier, and is yieldable outwardly to accommodate the changing position of the work pieces during rotation of the carrier, and also to accommodate changes in the diameter of the work. The hollow arm 33 also forms a guard or enclosure for the pulleys 21 and 22 and for the adjacent portion of the chain 26.

The pulley 23 is located at the lower portion of the housing 29 and to the rear of the carrier, and is carried on a shaft 39 which is mounted in a yoke 40 slidably fitting between the spaced side walls 30 of the housing, the pulley being disposed between the legs of the yoke. The ends of the shaft 39 are slidably guided in horizontal slots 41 formed in the opposite side wall of the housing 29. The yoke carries a rearwardly projecting rod 42 passing through an opening 43 in the housing, and is urged rearwardly by a compressed coil spring 44 surrounding the rod, the spring being confined between washers 45 and 46 and being retained by a nut 47 which is adjustable to vary the spring pressure.

The pulley 24 is located at the upper rear portion of the housing 29 and is arranged like the pulley 23, being carried by a shaft 48 mounted in a yoke 49, the ends of the shaft being slidably guided in horizontal slots 50 in the housing side wall. The yoke carries a rod 51 projecting rearwardly through the housing, and is urged rearwardly by a compressed coiled spring 52 disposed between washers 53 and 54, the spring pressure being adjustable by a nut 55 on the rod.

The pulley 25 is located at the front portion of the housing 29 above the work carrier and forwardly of the vertical plane of the carrier axis and is carried on a shaft 56 which is mounted in a yoke 57, the pulley being disposed between the legs of the yoke. The ends of the shaft 56 are slidably guided in inclined slots 58 formed in the side walls of the housing, these slots extending upwardly and rearwardly. A rod 59 extending parallel to the slots 58 is screw-threaded in the top portion of the housing and has a swivel connection 60 with the yoke, so as to permit raising and lowering of the yoke by rotating the screw. By raising the pulley 25 a sufficient distance the chain 20 will be released from clamping engagement with the topmost work piece, as seen in Fig. 3, so as to facilitate the replacement of broken drills or other manipulation of the drilling means. However, the work pieces at both milling stations will remain in clamped position, and the raising of the pulley 25 will not materially change the chain tension. When changing to work pieces of different diameter it is sometimes desirable to slightly change the elevation of the pulley 25 and also the compression of the springs 44 and 52, the use of two springs permitting a wide range of adjustment and also distributing the displacement of these springs and the pulleys 23 and 24. The elevation of the drill is adjusted in any suitable manner in accordance with the diameter of work.

In operation, the work carrier 12, 13 rotates intermittently in the direction indicated by the arrow, being indexed to the stationary position shown in Fig. 1. The work pieces are loaded onto the carrier at the station marked "Load," and the finished work pieces are unloaded at the same station. The newly introduced work pieces first move downwardly with the rotating carrier, being retained in the carrier jaws by the front portion of the chain loop 26. During indexing of the carrier through successive 45° intervals the swingable arm 33 will yield rearwardly and forwardly, so as to follow the work pieces and retain them in the jaws. The work pieces on the rotatable carrier successively reach the stations marked "Rough cut," "Finish cut" and "Drill center." At the first two of these stations the ends of the work pieces are faced by the milling cutters 15 and 16, and at the third and final station center openings are formed in the faced ends of the work pieces by the drills 17. Following the drilling operation the rotation of the carrier releases the work pieces from the clamping chain 20 and moves them to the unloading station where they are removed and replaced by fresh work pieces.

In the operation of the machine, the work pieces are automatically clamped on the movable carrier and are automatically released after the final tool operation. However, the work piece in the final tooling position can be manually released, as above described, without affecting the clamped condition of the succeeding work pieces, and if necessary the released work piece can be removed from the machine, as for the purpose of extracting a broken drill end. The inward and outward displacement of the swingable arm 33 does not materially affect the chain tension, and this tension remains approximately uniform during the rotation of the carrier.

In the case of an intermittently rotatable work carrier the milling cutters are preferably moved in a transverse direction to and away from the work while the carrier is stationary, whereas in the case of a continuously rotatable work carrier the cutter axes are preferably fixed.

When setting up the machine to operate on work pieces of different diameter, it is sometimes desirable to substitute jaw blocks 14 of different thickness, so as to avoid any appreciable change in the distance from the carrier axis to the drilling axis.

What I claim as new and desire to secure by Letters Patent is:

1. In a machine tool, the combination, with a movable work carrier for conveying work pieces to successive tooling positions, of a tensioned band for clamping the work pieces on the carrier, and shiftable means for locally releasing a portion of said tensioned band from clamping condition with respect to a work piece in one of its tooling positions while maintaining the tension of said bank.

2. In a machine tool, the combination, with a movable work carrier, of a tensioned band adapted to travel with the carrier for clamping the work on the carrier, means for supporting the band including a pulley adjacent to said carrier and adapted to receive the band thereon, and means for shifting said pulley away from said carrier to release locally a portion of said tensioned band from clamping position while maintaining the tension on said band.

3. In a machine tool, the combination, with a rotatable work carrier, of a tensioned clamping band having a reentrant loop extending partially about said carrier for clamping the work on the carrier, means for supporting said band including guide members adjacent to said carrier at the end portions of said loop, there being a passage between said guide members for admission of work pieces to the carrier, and shiftable means for supporting said guide members to permit displacement of said guide members toward and away from said carrier while maintaining the tension on said band.

4. In a machine tool, the combination, with a movable work carrier, of a tensioned band including a clamping portion for holding the work on the carrier, and means for supporting said band including a shiftable member normally urged toward said carrier and yieldable away from said carrier during the travel of the work while maintaining the tension on said band.

5. In a machine tool, the combination, with a movable work carrier, of a tensioned band including a clamping portion for holding the work on the carrier, means for supporting said band including a pulley adjacent to the carrier and over which pulley the band reversely passes, and a swingably mounted arm for supporting said pulley for movement toward and away from the carrier and approximately at right angles to the portions of said band extending from said pulley so as to permit the swinging movement of said pulley-supporting arm while maintaining the tension of said band.

6. In a machine tool, the combination, with a movable work carrier, of a tensioned band including a clamping portion for holding the work on the carrier, means for supporting said band including a pulley adjacent to the carrier and over which pulley the band passes, and a swingably mounted arm for supporting said pulley for movement toward and away from the carrier, said band supporting means including a second pulley approximately coaxial with the pivotal axis of said arm.

7. In a machine tool, the combination, with a movable work carrier, of a tensioned band including a clamping portion for holding the work on the carrier, means for supporting said band including a pulley adjacent to the carrier and over which pulley the band passes, a swingably mounted arm for supporting said pulley adjacent to the work-loading region of said carrier for work-confining movement toward and away from the carrier during the movement of the carrier, and means for limiting the pivotal movement of said arm toward the carrier.

8. In a machine tool, the combination, with a movable work carrier for conveying work pieces to successive tooling positions including a final drilling position, of a tensioned band for clamping the work pieces on the carrier, and shiftable means for locally releasing a portion of said tensioned band from clamping condition with respect to a work piece in its drilling position while maintaining the tension on said band.

WILLIAM H. WEIMER.